United States Patent [19]

Sigg

[11] 4,153,002

[45] May 8, 1979

[54] MARINE GEAR DRIVES

[75] Inventor: Hans Sigg, Mutschellen, Switzerland

[73] Assignee: Maag Gear-Wheel Machine Company Limited, Zürich, Switzerland

[21] Appl. No.: 808,725

[22] Filed: Jun. 21, 1977

[30] Foreign Application Priority Data

Jun. 25, 1976 [DE] Fed. Rep. of Germany ....... 2628572

[51] Int. Cl.² ............................................ B63H 23/32
[52] U.S. Cl. .................................. 115/900; 74/665 R
[58] Field of Search ................. 115/34 R, 72, 76, 900;
74/665 A, 665 B, 665 D, 665 E, 665 R; 192/4 C

[56] References Cited

U.S. PATENT DOCUMENTS

| 1,342,797 | 6/1920 | Conti | 74/665 B |
| 2,229,544 | 1/1941 | Bauer | 115/34 R |
| 2,741,351 | 10/1956 | Fletcher et al. | 115/900 |
| 3,388,684 | 6/1968 | Gros et al. | 74/665 A |

FOREIGN PATENT DOCUMENTS

| 225268 | 11/1958 | Australia | 115/900 |
| 922749 | 12/1954 | Fed. Rep. of Germany | 115/34 R |
| 110829 | 6/1940 | United Kingdom | 74/665 B |

Primary Examiner—Trygve M. Blix
Assistant Examiner—Jesus D. Sotelo
Attorney, Agent, or Firm—Toren, McGeady and Stanger

[57] ABSTRACT

A marine gear drive has two drive pinions for coupling to respective high-speed and low-speed engines and both pinions connected through intermediate gears to a common larger gear adapted to be coupled to a propeller shaft. The drive pinions, intermediate gears and larger gear are disposed in only two planes and one drive pinion is in the driving train from the other drive pinion to the larger gear. An arrangement for a twin propeller drive, with each propeller driven by high-speed and low-speed engines as aforesaid, counter-rotates the propellers without reversing the direction of rotation of the drive inputs.

6 Claims, 4 Drawing Figures

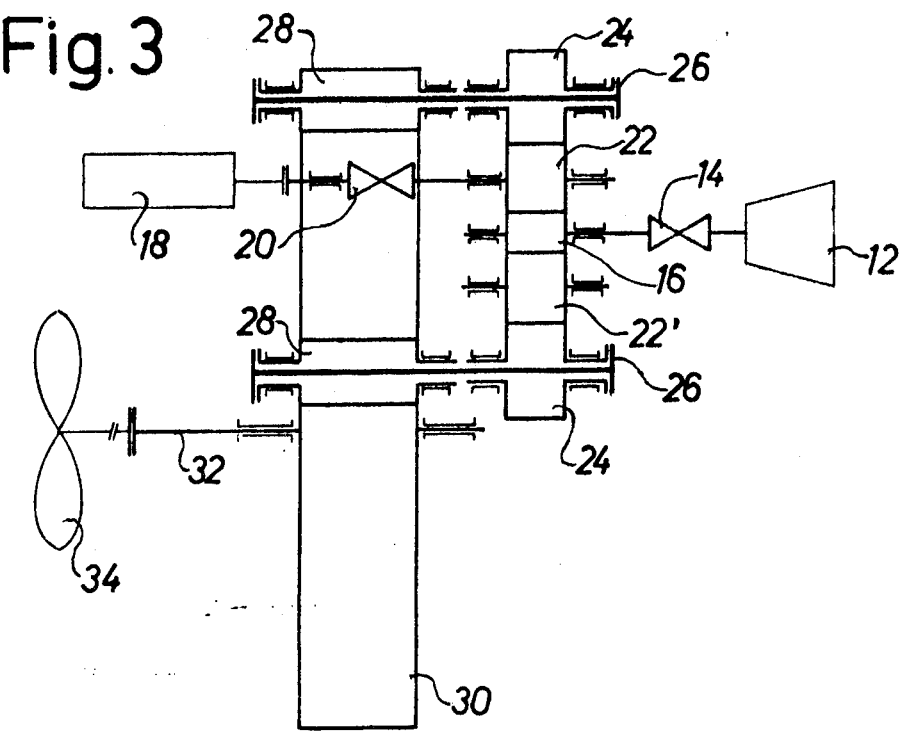
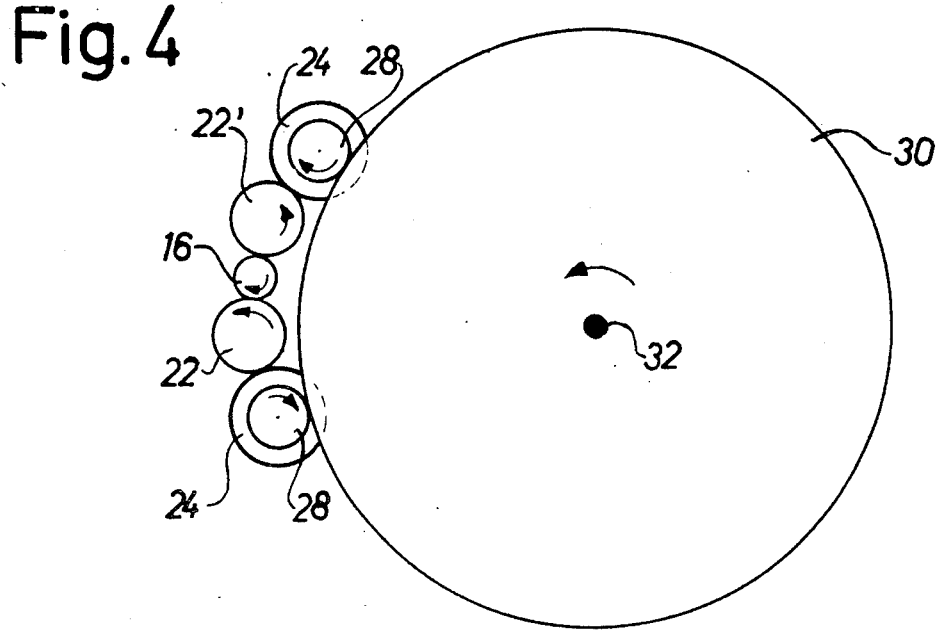

MARINE GEAR DRIVES

BACKGROUND OF THE INVENTION

This invention relates to a margine gear drive having two drive pinions each of which is adapted to be coupled to a propulsion engine and which by way of intermediate or layshaft gears drive a common gear which is adapted to be coupled to a propeller shaft, the common gear, the layshaft gears, and the pinions being disposed in only two planes.

In one known marine gear drive of this kind each of two drive pinions meshes with two intermediate or layshaft gears, each of which is connected by a torsion shaft to a pinion, which in turn meshes with a larger common gear. The drive transmission between the two drive pinions and the larger gear thus comprise a total of four intermediate or layshaft gears, four torsion shafts, and four pinions meshing with the larger common gear. The constructional cost this entails is justified when both propulsion engines normally supply power to the larger gear, and thereby to the propeller shaft, simultaneously. If however in normal operation, at so-called cruising speeds, only one propulsion engine is intended to operate while the second propulsion engine is brought into use only when particularly high power is required, this constructional cost seems too high, particularly if the two propulsion engines differ in respect of power and speed in such a manner that a gear drive with power branching is justified only for the more powerful and faster of them. This is particularly the case with coastguard boats and warships, in which a diesel engine is provided for cruising and a gas turbine for active engagements.

With the abovementioned known gear drive it might appear obvious for such purposes to arrange one drive pinion to mesh only with one intermediate gear and to omit the other intermediate gear together with the associated torsion shaft and the pinion fastened thereon. However, the saving achieved is offset by the disadvantage that for the one drive pinion the drive transmission cannot then be preloaded and it rattles or vibrates when power is supplied only to the other drive pinion from its propulsion engine.

The problem underlying the invention is to improve a marine gear drive of the kind described above, particularly for use in coastguard boats and warships, in such a manner that the number of gears running idle when only one propulsion engine is in use is restricted to a minimum.

SUMMARY OF THE INVENTION

According to the invention this problem is solved in that the one drive pinion is disposed in the drive train leading from the other drive pinion to the common gear.

The two drive pinions preferably mesh directly with one another.

For a ship's combined drive powered by a high-speed propulsion engine and a low-speed propulsion engine, particularly a gas turbine and a diesel engine respectively, a gear drive according to the invention is particularly suitable in which the two drive pinions are so selected in relation to one another in respect of their number of teeth that the two engines can simultaneously drive the common output gear at their normal operating rotational speeds.

According to a preferred feature of the invention the gear drive can be further developed by making the drive pinion of the low-speed propulsion engine an intermediate gear with the aid of which the drive pinion of the high-speed propulsion engine drives an intermediate or layshaft gear which lies in the same plane and to which is connected a pinion meshing directly with a larger common gear.

An important field of application of the invention lies in marine gear drives with load branching by way of two intermediate gears each of which is connected by a shaft to a pinion meshing with the larger common gear, at least one shaft being in the form of a preloadable torsion shaft. According to the invention, in this arrangement it is preferable for both the drive pinions to be disposed in the self-contained drive train that comprises the intermediate gears, at least one torsion shaft, and the common gear. This arrangement provides the advantage that not only all the intermediate gears and pinions disposed between the drive pinions and the larger gear but also the drive pinions themselves always participate in the transmission of power, whichever of the two propulsion engines supplies power.

The invention affords further advantages in a ship's combined drive having two propellers which turn in opposite directions and each of which can be selectively driven by a high speed and/or low speed propulsion engine. In marine drives of this kind the problem in fact exists that propulsion engines suitable for them, particularly gas turbines, can normally be supplied only for one of the two possible directions of rotation. The invention can be applied, depending on the desired arrangement of the propulsion engines in relation to the gear drives, so as to permit the direction of rotation to be reversed in a simple manner within the port or starboard gear drive. This may be achieved by providing one propeller with a gear drive in which the two drive pinions mesh directly with each other, preferably having teeth in a suitable ratio for both engines to drive the common larger gear simultaneously and in which the drive pinion of the slow running propulsion engine forms the commencement of the drive train, while the other propeller drive has the drive pinion of the lower speed engine acting as an intermediate gear by means of which the high speed engine drive gear drives an intermediate gear lying in the same plane and to which is connected a further pinion meshing directly with the larger common gear. In the case of said other propeller drive, if there is load branching by way of two intermediate gears each of which is connected by a shaft to a further pinion meshing with the common gear, at least one of said shafts being a preloadable torsion shaft, then preferably the two drive pinions are disposed in a self-contained drive train comprising the intermediate gears, at least one of the torsion shafts and the common gear.

Examples of the invention are explained more fully below with the aid of the accompanying diagrammatic drawings.

BRIEF DESCRIPTION OF THE DRAWINGS

FIG. 3 is a side view, viewed from the midships plane, of a marine drive system disposed on the starboard side, and FIG. 4 is the same view from the stern.

DESCRIPTION OF THE PREFERRED EMBODIMENTS

Figure 1:
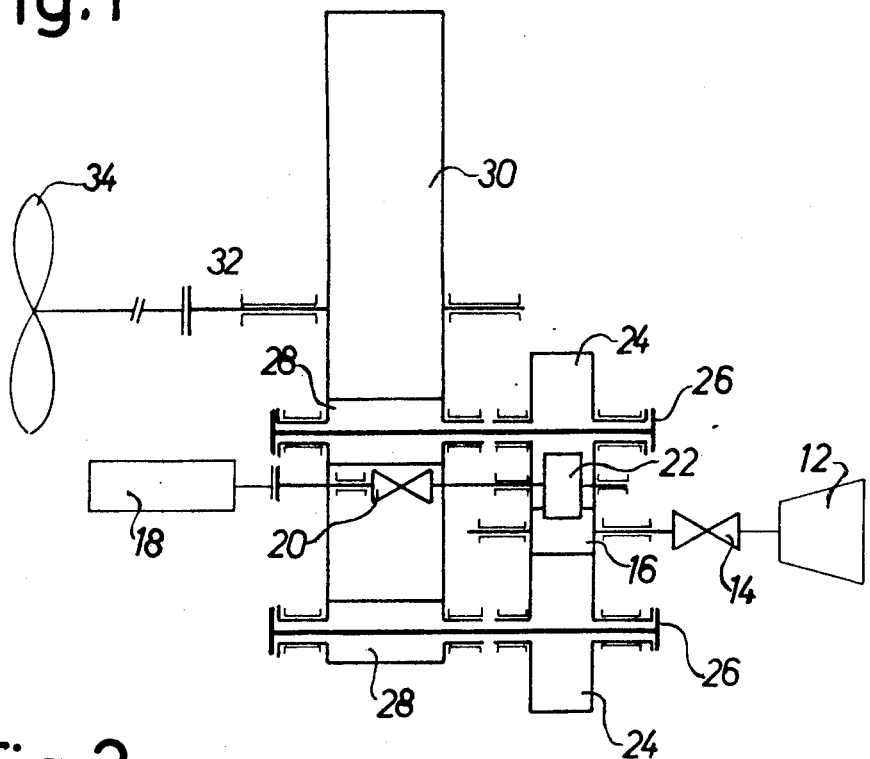
FIG. 1 is a side view, viewed from the midship's plane, of a marine drive system disposed on the port side.
Figure 2:
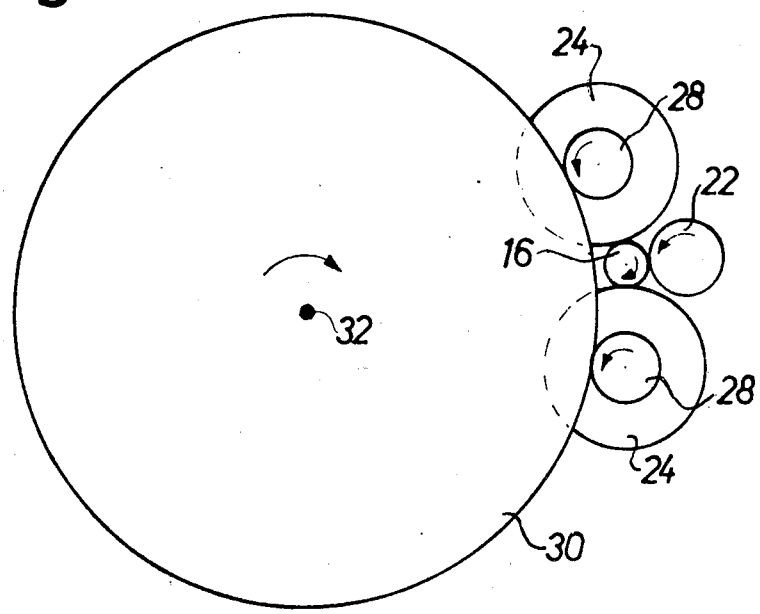
FIG. 2 is the same view from the stern.

The two marine drive systems shown in FIGS. 1 and 2 on the one hand and in FIGS. 3 and 4 on the other hand, have the following features in common:

A high speed propulsion engine 12, chiefly a gas turbine, is connected by way of a synchronising clutch 14 to a drive pinion 16. A low speed propulsion engine 18, chiefly a diesel engine, is connected by way of a synchronising clutch 20 to a drive pinion 22. The drive pinions 16 and 22 mesh directly with one another. In view of the different operating speeds of the propulsion engines 12 and 18, the drive pinions 16 and 22 have different numbers of teeth so that both propulsion engines can supply power simultaneously, at least temporarily. Given an operating speed of the high speed propulsion engine 12 of 3600 revolutions per minute and an operating speed of the low speed propulsion engine 18 of 1500 revolutions per minute, the ratio of the number of teeth between the drive pinions 16 and 22 thus is 15:36.

The two marine gear drives on the starboard and port sides also correspond in that each has two intermediate or layshaft reduction gears 24, each of which is connected by a torsion shaft 26 to a pinion 28 of a second stage, the torsion shafts being preloaded in a manner known per se. In each of the two gear drives the pinions 28 mesh with a common larger gear 30, which is connected by way of a propeller shaft 32 to a propeller 34, and in both instances the drive pinions, the larger common gear and the layshaft gear drive interconnecting them are disposed in only two planes.

In the port gear drive of FIGS. 1 and 2 the high speed drive pinion 16 meshes directly with the two intermediate gears 24; the slow speed drive pinion 22 meshes only with the high speed drive pinion 16. Consequently, the larger gear 30 of the port gear drive turns in the same direction as the high speed drive pinion 16 and oppositely to the direction of rotation of the slow speed drive pinion 22.

In the starboard gear drive of FIGS. 3 and 4 the slow speed drive pinion 22 meshes on the one hand with the high speed drive pinion 16 and on the other hand with one intermediate gear 24. Between the other intermediate gear 24 and the high speed drive pinion 16 is disposed an intermediate gear 22' which has the same number of teeth as the drive pinion 22.

In the starboard gear drive the larger gear 30 turns oppositely to the high speed drive pinion 16, but in the same direction as the low speed drive pinion 22. For this reversal of the direction of rotation the only additional gear required is the intermediate gear 22', with which at the same time the advantage is achieved that all the gears lie in a self-contained drive train which can be preloaded by the torsion shaft 26.

From the drawings it can be seen that the space required to accommodate each of the two gear drives for a given diameter of the larger gear 30 is relatively small, so that despite the usually restricted space conditions on board ships the gear drives can easily be accommodated.

What is claimed is:

1. A marine gear drive having two main propulsion means and a drive train comprising a respective drive pinion for each said propulsion means, and releasable coupling means between the drive pinions and their respective propulsion means for coupling said drive pinions to their respective propulsion means, each drive pinion being directly connected to the coupling means of its respective propulsion means, a common output gear for coupling the drive to a propeller shaft and drive transmission means for coupling said drive pinions to said common output gear to drive said output gear from the main propulsion means, said pinions, drive transmission means and common gear being disposed in only two planes, the two drive pinions meshing directly with one another and one of the drive pinions being arranged in the drive between the other said drive pinion and the common gear.

2. A marine gear drive according to claim 1 for a combined drive system having a second propeller shaft and a further two said main propulsion means, said propulsion means being arranged as two groups each consisting of a high speed propulsion engine and a low speed propulsion engine and each of said groups of two propulsion means having a drive train for a respective propeller shaft, the drive trains being arranged to rotate the two propeller shafts in opposite directions, the drive train to one of said propeller shafts having its two drive pinions of the respective engines meshing directly with each other and the drive pinion of the low speed engine forming the beginning of the drive train to said one propeller shaft, the drive to the other of said propeller shafts having the drive pinion of the low speed engine forming an intermediate gear by means of which the drive pinion of the high speed engine drives the common gear for said other propeller shaft, the drive train to said other propeller shaft comprising a layshaft gear in the same plane as both said drive pinions and being connected through said low speed engine pinion to the high speed engine pinion, and a further pinion meshing directly with said common gear being connected to said layshaft gear.

3. A marine gear drive according to claim 1 wherein one of said propulsion means is a high speed propulsion engine and the other is a low speed propulsion engine the two drive pinions having teeth so proportioned in number to one another that both propulsion engines can simultaneously drive the common gear at their normal operating speeds of rotation.

4. A marine drive gear according to claim 3 wherein said high speed propulsion engine is a gas turbine and said low speed propulsion engine is a diesel engine.

5. A marine gear drive according to claim 3, wherein said drive pinion of the low speed propulsion engine forms an intermediate gear by means of which the drive pinion of the high speed propulsion engine drives said common gear, a layshaft gear in the same plane as both said drive pinions and being connected through said low speed engine pinion to the high speed engine pinion, and a further pinion meshing directly with said common gear being connected to said layshaft gear.

6. A marine gear drive according to claim 1 comprising two layshaft gears through which the drive is shared, a respective shaft for each said gear connecting it to a respective further pinion meshing with the common gear, at least one of said shafts being in the form of a preloadable torsion shaft, the two drive pinions are disposed in a self-contained drive train comprising the layshaft gears at least one of said shafts and the common gear.

* * * * *